US012637863B2

(12) United States Patent
Batenburg et al.

(10) Patent No.: US 12,637,863 B2
(45) Date of Patent: May 26, 2026

(54) CONSTRUCTION MATERIAL

(71) Applicant: Dakip B.V., Wapenveld (NL)

(72) Inventors: Lawrence Fabian Batenburg, Wapenveld (NL); Hendrikus Johannes Theresia Maria Meeusen, Wapenveld (NL)

(73) Assignee: Dakip B.V., Wapenveld (NL)

( * ) Notice: Subject to any disclaimer, the term of this patent is extended or adjusted under 35 U.S.C. 154(b) by 1000 days.

(21) Appl. No.: 17/765,817

(22) PCT Filed: Oct. 1, 2020

(86) PCT No.: PCT/IB2020/059212
§ 371 (c)(1),
(2) Date: Mar. 31, 2022

(87) PCT Pub. No.: WO2021/064634
PCT Pub. Date: Apr. 8, 2021

(65) Prior Publication Data
US 2022/0364366 A1 Nov. 17, 2022

(30) Foreign Application Priority Data
Oct. 1, 2019 (NL) ..................................... 2023928

(51) Int. Cl.
| *E04D 5/06* | (2006.01) |
| *C08J 5/18* | (2006.01) |
| *C08K 3/22* | (2006.01) |
| *C08K 5/00* | (2006.01) |

(52) U.S. Cl.
CPC .................. *E04D 5/06* (2013.01); *C08J 5/18* (2013.01); *C08K 3/22* (2013.01); *C08K 5/0016* (2013.01); *C08K 5/005* (2013.01); *C08K 5/0066* (2013.01); *C08J 2329/14* (2013.01); *C08K 2003/2241* (2013.01)

(58) Field of Classification Search
CPC ....................................................... E04D 5/06
See application file for complete search history.

(56) References Cited

U.S. PATENT DOCUMENTS

| 4,277,533 A | 7/1981 | Kumins et al. |
| 4,727,699 A * | 3/1988 | Sargent .................. E04D 5/147 |
| | | 52/410 |
| 2005/0249911 A1 | 11/2005 | Randall et al. |
| 2018/0094138 A1 | 4/2018 | Aerts et al. |
| 2018/0187419 A1 * | 7/2018 | Lai ........................ B32B 27/304 |
| 2019/0345311 A1 * | 11/2019 | Tiyapiboonchaiya ... C08K 5/12 |

FOREIGN PATENT DOCUMENTS

| EP | 3269777 A1 | 1/2018 |
| EP | 3447775 A1 | 2/2019 |
| WO | 01/21367 A1 | 3/2001 |
| WO | 2016/075857 A1 | 5/2016 |
| WO | WO-2016108686 A1 * | 7/2016 ............. B32B 15/08 |

OTHER PUBLICATIONS

International Search Report issued in PCT/IB2020/059212; mailed Feb. 10, 2021.
Written Opinion of the International Search Authority for PCT/IB2020/059212; mailed Feb. 10, 2021.

* cited by examiner

*Primary Examiner* — Peter F Godenschwager
(74) *Attorney, Agent, or Firm* — Studebaker Brackett PLLC

(57) ABSTRACT

A construction material comprises a watertight sheet material of a mixture of a plastic and at least one additive. The plastic comprises at least substantially polyvinyl butyral (PVB). At least a fire retardant containing ammonium polyphosphate is added thereto as additive. Use is particularly made of recycled polyvinyl butyral.

12 Claims, No Drawings

CONSTRUCTION MATERIAL

The present invention relates to a construction material, particularly a roof covering material, comprising a watertight sheet material from at least a plastic and at least one additive.

As roof covering material, such a construction material is usually applied for making watertight mainly flat and slightly pitched roofs of houses, other buildings and other roof constructions which must be protected against the effects of weather and wind. Roof covering materials usual heretofore usually comprise a plastic sheet material which is applied to the roof surface in question in the form of sheets and adhered or fused thereto. Roughly two groups of roof covering material are distinguished here in practice, i.e. plastic-based sheet material and roofing felt. Roofing felt comprises a roof covering containing tar and bitumen and is usually torched onto the roof surface at increased temperature. PVC (polyvinyl chloride) and EPDM (Ethylene Propylene Diene Monomer), which are usually adhered at ambient temperature, are mainly used in practice as plastic-containing sheet material.

Although a roofer has a wide selection at their disposal with these materials and the various forms in which they are embodied, there is a need for a roof covering material which, in addition to being supplied in unadulterated state, can also be supplied as recycled product and thereby support a circular economy.

Other applications of a construction material of the type described in the preamble are for instance sealing membranes to replace for instance a lead flashing as water barrier for a wall vent or door or window frame. In addition, watertight sheet materials are also applied to make floors and walls, particularly in cellars, watertight.

The present invention therefore has for its object, among others, to provide a construction material which is suitable for and/or is based on reuse and is nevertheless on par with construction materials which are usual in practice for the stated and other fields of application.

In order to achieve the stated object a construction material of the type described in the preamble has the feature according to the invention that the plastic comprises at least substantially polyvinyl butyral (PVB) and that at least a fire retardant containing ammonium polyphosphate $(NH_4PO_3)_n$ is added thereto as additive, wherein for the plastic use is particularly made of recycled polyvinyl butyral. Surprisingly, it has been found that such a composition of the sheet material is shown in practice to meet requirements in respect of tensile strength, fire safety and durability, while reclaimed and reclaimable PVB can advantageously be used as base material therefor. Ammonium polyphosphate is a crust-forming material and acts as a barrier material when it forms a firm crust at high temperatures. This reduces the oxygen concentration at the surface of the polyvinyl butyral sheet material and the concentration of combustible gases.

In an embodiment which can be readily implemented in practice the construction material according to the invention is characterized in that polyvinyl butyral (PVB) and ammonium polyphosphate are used in the mixture in a weight ratio of about 100:4-50. This weight ratio has been found in practice to impart an adequate fire retardance to the plastic.

From an economic viewpoint it is desirable to limit the amount of plastic in the sheet material while maintaining the quality and processability of the material. A cost-effective embodiment of the construction material according to the invention has in this respect the feature that the at least one additive also comprises aluminium trihydrate $(Al(OH)_3)$.

The addition of ATH cools the sheet material when it is heated since water is then released, which extracts heat from the surface when it evaporates. The concentration of combustible gases will also be diluted by the released water vapour. A critical ratio of oxygen and combustible gases which may escape during heating is thus delayed for longer. ATH is thus not only a filler material, ATH is utilized mostly as relatively inexpensive fire retardant which contributes significantly to the fire-resistant properties and safety of the material. The combination of ATH and ammonium polyphosphate in polyvinyl butyral (PVB) is found here to provide a particularly surprising strong fire retardance, and moreover not to detract from the processability of the construction material. It has been found in practice that the joint content thereof in the sheet material can be considerable and the proportion of the plastic (PVB) otherwise used therein can thereby be limited.

A particular embodiment of the construction material according to the invention has in this respect the feature that polyvinyl butyral (PVB) and the aluminium trihydrate (ATH) are used in the mixture in a weight ratio of about 100:40-50, particularly in the form of particles with an average particle size smaller than 100 microns, particularly smaller than about 60 microns. Such an ATH content was found in practice not to result in a noticeable deterioration of the properties and processability of the material, while the applied grain size enhances a homogenous incorporation in the melt.

Roof covering material is applied frequently on roof surfaces which will be continuously exposed to sunlight on sunny days. Sunlight is a natural enemy to many plastics due to the ultraviolet radiation present therein, whereby polymer bonds can break, and due to the effect of heliothermal heat whereby the material can soften and could lose its mechanical properties. In order to prevent this a preferred embodiment of the construction material has the feature according to the invention that the at least one additive in the mixture also comprises a colouring agent, and more particularly that a white pigment, particularly comprising titanium dioxide, is used as the colouring agent. The colouring agent gives the material an attractive, even appearance, even if use was made of a reclaimed and thereby possibly not entirely pure plastic. The white oxides of titanium moreover ensure that UV and other light rays are reflected. The effect is a cooler surface. Titanium oxide thereby also has a function as UV blocker, whereby degradation of the polymer (PVB) will occur less quickly, which is particularly advantageous for a roof covering material.

By making use of a white pigment the material is also better able to withstand the effects of sunlight as compared to usual black or at least dark roof covering in that it will thus be reflected to greater extent, rather than absorbed. Further contributing hereto is a further particular embodiment of the construction material according to the invention, characterized in that the at least one additive in the mixture comprises a UV stabilizer and an antioxidant.

Packages of primary and secondary antioxidants can here be applied in order to obtain long-term stability. Primary antioxidants function as radical catchers and particularly remove peroxyl radicals (ROO·) and, to a lesser extent, alkoxy groups (RO·), hydroxyl radicals (HO·) and alkyl radicals (R·). Oxidation begins with the formation of alkyl radicals, which react rapidly with molecular oxygen and thus form peroxyl radicals. Secondary antioxidants particularly remove organic hydroperoxides (ROOH) formed by the effect of primary antioxidants. Hydroperoxides are less reactive than radicals, but undergo hemolytic bonding and break new radicals.

Such additives, such as UV stabilizers, primary and secondary antioxidants, heat stabilizers, and process stabilizers can already be incorporated in the PVB, or can be compounded directly during preparation of the sheet compound.

In addition, plasticizers can advantageously also be added in order to keep the viscosity of the compound sufficiently flexible and processable. A particular embodiment therefore has the feature that the at least one additive in the mixture comprises at least a plasticizer. A plasticizer can here be mixed in first, but a further particular embodiment has the feature that the polyvinyl butyral comprises plasticized polyvinyl butyral which was provided with at least a plasticizer before mixing in an additive. Plasticized PVB provides the option of influencing the process parameters and improving the fire-retardant properties of the final product, in addition to adjusting the flexibility of the final product depending on the specific application thereof, such as for instance in roofing membranes or as alternative to lead flashings.

For a practical processability of a roof covering material it is preferably supplied on a roll and placed and adhered in sheets in the correct size onto the surface for covering in situ. With a view thereto a practical embodiment of the construction material has the feature according to the invention that the sheet material has a thickness of half a millimetre to several millimetres, particularly between 0.6 and 5 millimetres, by a width of half a metre to several metres, and is wound into a roll with a length of several metres or several tens of metres to over a hundred metres.

The invention will be further elucidated hereinbelow on the basis of an exemplary embodiment.

EXEMPLARY EMBODIMENT

As starting material, use is made of polyvinyl butyral (PVB) which is supplied in granular form and with which a hopper is filled. Polyvinyl butyral is applied as a thin sheet material in layered glass, mainly in vehicles, and can be reclaimed therefrom and be reused in the construction material according to the invention. Reclaimed PVB is therefore advantageously used for the production of the construction material.

A second hopper is filled with powder containing ammonium polyphosphate, which is added as fire retardant, while a third hopper is filled with aluminium trihydrate (ATH) which can be employed as filler and also additional fire retardant. In both cases use is made of a fine powder with an average grain size in the order of 60 micron.

Each hopper is provided at the bottom with a dosing unit, a rotational speed of which can be controlled individually. A dosage of the different constituents can thereby be controlled individually. Use is preferably made here of a gravimetric dosing whereby the concentrations of the different constituents can be dosed with great accuracy. Said fractions are thus supplied, after optionally being mixed together beforehand, to a screw elevator of an extrusion device in a ratio of about 2:1:1 and therein gradually melted into a homogeneous mass under the influence of additionally supplied heat.

A colouring agent in the form of several percent by weight of titanium oxide and/or titanium dioxide is also added to the mixture from containers provided for this purpose. In order to avoid the formation of lumps therein and to enhance a uniform mixing use is here advantageously made of plastic granules which were enriched beforehand with titanium (di)oxide. Use is for this purpose particularly made of polyvinyl butyral (PVB) granules. Because this is however only a relatively small proportion of the whole, use can however also be made of a different plastic such as polyethylene (PE).

A small percentage of UV stabilizer and antioxidant is dosed into the mixture in similar manner. The UV stabilizer serves to give the final sheet material material an increased resistance to UV radiation from sunlight, while the antioxidant already protects the material during the manufacturing process from degradation resulting from the increased process temperature. The composition of the thus obtained mixture is shown in table 1.

TABLE 1

| Constituent: | Content<br>% by weight |
| --- | --- |
| Polyvinyl butyral (PVB) | 48.00% |
| Aluminium trihydrate (ATH) | 24.81% |
| Ammonium polyphosphate (FR) | 24.81% |
| Titanium(di)oxide (pigment) | 2.00% |
| UV blocker(s) | 0.35% |
| Antioxidant(s) | 0.03% |
| | 100.00% |

The viscous melted mass is carried under pressure to an extrusion unit and therein pressed through a gap of several millimetres, having a width in the order of a metre to several metres. In this embodiment use is made in this respect of an extrusion mould with a gap width of 1500 millimetres and a selected gap height of 1, 1½, 2, 3 or 4 millimetres. This produces a continuous sheet material of roughly the same dimensions. This sheet material, still warm, is cooled over an assembly of several successive rollers and then carried over a long table of several tens of metres in order to allow the sheet material to cool and relax.

Finally, the cooled sheet material is carried via a conveyor belt of several tens of metres to a winding unit and then finally formed into a roll at a desired length. When the desired length is reached, the sheet material is cut, after which a subsequent roll is formed in similar manner.

The thus obtained material is subjected to a set of tests as according to a standard EN-13956, wherein the material was compared to samples of common, commercially available roof covering materials. In respect of the material according to the invention use is made in this test of sheet materials having thicknesses of respectively 1 and 1½ millimetres. As reference material, use was made of a PVC sheet material with a thickness of 1½ millimetres, an EPDM foil with a thickness of about 2 millimetres, and bituminous roofing felt with a thickness of about 2 millimetres, referred to below as FPO.

Watertightness:

The watertightness of the reference samples has been proven in practice, and is therefore not investigated further. The sample of the material according to the invention likewise passed the test for leak-tightness with flying colours, wherein the sheet material was subjected to both a 10-metre static water column and a dynamic water jet at a water pressure of about 2 atmosphere. The sample comfortably complies with the standard.

Tensile Strength:

The tensile strength of the sample and of the reference samples was measured both in longitudinal and transverse direction. In respect of the sample, use was made here of the longitudinal direction and transverse direction relative to the production direction of the sheet material. These values were found to be substantially identical to each other. The elongation of the material was also determined. The test results are stated in table 2.1. It can be inferred herefrom that, in terms of tensile strength and elongation, the material of the sample according to the invention performs no worse and even better than the common commercially available materials which were subjected to the same test. The material according to the invention therefore comfortably complies with the standard.

TABLE 2.1

|  | Property: | PVB | PVC | EPDM | FPO |
|---|---|---|---|---|---|
| longitudinal | Tensile strength [N/mm²] | 22 | 22 | 8 | ≥9 |
|  | Elongation at break [%] | 230 | ≥15 | 300 | ≥550 |
| transverse | Tensile strength [N/mm²] | 23 | 22 | 8 | ≥7 |
|  | Elongation at break [%] | 230 | 15 | 300 | 550 |

Weld Strength:

Two strips of the test material are glued together in a prescribed manner, and the whole was then subjected to a tensile strength. Because bituminous materials are not glued but are welded (fused) to each other, this material was omitted from the comparison. The test results are shown in table 2.2. The strength of an adhesion of the sample according to the invention was found to be of the same order of magnitude as that of the reference samples, and lies comfortably within the standard.

TABLE 2.2

| Property: | PVB | PVC | EPDM | FPO |
|---|---|---|---|---|
| Maximum Weld strength [N] | 156 | 200 | 150 | X |

Impact Resistance:

The resistance to mechanical impact was tested by dropping a sharp object onto the sample from a determined height. The maximum height from which an object can be released without perforating the sample is stated in table 2.3. This was tested with both a relatively hard object of aluminium and a softer object of plastic. This also shows that the material of the sample according to the invention is comparable to that of the reference samples, and falls within the standard.

TABLE 2.3

|  | Property: | PVB | PVC | EPDM | FPO |
|---|---|---|---|---|---|
| hard | Maximum drop height [mm] | 1250 | ≥800 | — | 1250 |
| soft | Maximum drop height [mm] | 2000 | — | 1000 | 1500 |

Fire Retardance:

Finally, the sample material is exposed to a standardized fire test in order to thereby determine fire resistance. A standardized fire source with a temperature of around 800° C. was here placed on a sheet of 800 by 1800 millimetres, and a duration within which the material caught fire was measured. The fire went out completely after 12 minutes and 33 seconds. With this, the material according to the invention provides an outstanding fire retardance and resistance to heating. An additional advantage is that PVB does not give off toxic gases when it burns.

The foregoing justifies the claim that the material according to the invention meets the requirements of watertightness as set by the standard. The material according to the invention combines here a high tensile strength, such as that of PVC, with a great stretchability, such as that of EPDM. The strength of a weld (adhesion) in the material according to the invention is of the same order as the known commercially available materials and complies with the standard. The resistance to mechanical impact is at least as great as that of the other tested materials, or even higher. In the case of thicker sheet materials, from 1M millimetres, it was even found that the other materials could not match this property of the material according to the invention. The material according to the invention provides particularly good properties in terms of fire resistance, and is moreover not toxic when it burns.

Finally, a considerable cost reduction can be achieved with a roof covering on the basis of the PVB material according to the invention in that both the material costs and the costs for processing are significantly lower than those of roof covering materials common heretofore. In practice, it has been found that a roof covering with the material according to the invention can be placed considerably more quickly, up to two times faster. The invention thereby provides a particularly attractive alternative to these known roof covering materials; not least because the invention allows the use of reclaimed and reclaimable plastic (PVB).

Although the invention has been further elucidated above on the basis of only a single exemplary embodiment, it will be apparent that the invention is by no means limited thereto. On the contrary, many variations and embodiments are still possible within the scope of the invention for a person with ordinary skill in the art.

Plasticizers in particular can thus be added to the sheet material in order to thereby improve the flexibility and processability. These plasticisers can be oily or glycol-like materials, but can for instance also comprise polymer plasticizers. Surprisingly, it has been found that the fire-retardant properties of the final construction material can thereby also be improved. This was particularly found when polymer plasticizers were applied, such as Elvaloy® ethylene/vinyl acetate/carbon monoxide (E/VA/CO) co-polymer.

Similar results were also achieved with other mutual ratios of the PVB, ammonium polyphosphate (APP) and ATH. These components can thus also be applied in a ratio of 100 PVB:40 ATH:4 APP. A colour can be added thereto, and one or more UV stabilizers and plasticizers can be mixed in. A compound with a proportion of 15% ATH and 15% APP relative to the used PVB likewise produced satisfactory results. The formulation according to the invention generally gives the skilled person the option of forming an outstanding new construction material, which can in turn also be recycled and renewed again afterwards, from PVB which may or may not be recycled, depending on the specific application. Besides roof covering, other structural applications are also possible, such as particularly an alternative to a lead flashing as water barrier for door and window frames and vents, and as a waterproof finish for cellar floors and watertight sheet material in underwater and sub-surface applications.

The invention claimed is:

1. A roof covering, comprising a watertight sheet material from at least a plastic and at least one additive, characterized in that the plastic comprises at least substantially polyvinyl butyral (PVB), wherein the at least one additive comprises at least a fire retardant containing ammonium polyphosphate $(NH_4PO_3)_n$ (APP) and aluminum trihydrate $(Al(OH)_3)$ (ATH):

wherein the polyvinyl butyral (PVB) and the ammonium polyphosphate $(NH_4PO_3)_n$ (APP) are used in the mixture in a weight ratio of about 100:4-50; and wherein the polyvinyl butyral (PVB) and the aluminum trihydrate (ATH) are used in the mixture in a weight ratio of about 100:40-50.

2. The roof covering of claim 1, characterized in that the at least one additive in the mixture also comprises a coloring agent.

3. The roof covering of claim 2, characterized in that a white pigment, comprising titanium oxide and/or titanium dioxide, is used as the coloring agent.

4. The roof covering of claim 1, characterized in that the at least one additive in the mixture comprises one or more selected from the group consisting of a UV stabilizer and an antioxidant.

5. The roof covering of claim 1, characterized in that the at least one additive in the mixture comprises at least a plasticizer.

6. The roof covering of claim 5, wherein the plasticizer comprises an ethylene/vinyl acetate/carbon monoxide copolymer.

7. The roof covering of claim 1, characterized in that the sheet material has a thickness of half a millimeter to several millimeters, by a width of half a meter to several meters, and is wound into a roll with a length of several meters or several tens of meters to over a hundred meters.

8. The roof covering of claim 1, wherein the polyvinyl butyral is recycled polyvinyl butyral.

9. The roof covering of claim 1, wherein the aluminum trihydrate is in the form of particles with an average particle size smaller than 100 microns.

10. The roof covering of claim 7, wherein the sheet material has a thickness of between 0.6 and 5 millimeters.

11. The roof covering of claim 1, wherein the polyvinyl butyral, aluminum trihydrate and ammonium polyphosphate are applied in a ratio of about 2:1:1.

12. The roof covering of claim 1, wherein the polyvinyl butyral (PVB), aluminum trihydrate (ATH) and ammonium polyphosphate (APP) are applied in a ratio of 100 PVB:40 ATH:4 APP.

\* \* \* \* \*